(12) United States Patent
Grothe

(10) Patent No.: US 8,681,109 B2
(45) Date of Patent: Mar. 25, 2014

(54) DISPLAY SYSTEM AND METHOD INCLUDING A STIMULI-SENSITIVE MULTI-FUNCTION DISPLAY WITH CONSOLIDATED CONTROL FUNCTIONS

(75) Inventor: Steven P. Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 751 days.

(21) Appl. No.: 12/886,309

(22) Filed: Sep. 20, 2010

(65) Prior Publication Data
US 2011/0006983 A1 Jan. 13, 2011

Related U.S. Application Data

(63) Continuation-in-part of application No. 11/680,418, filed on Feb. 28, 2007, now abandoned.

(51) Int. Cl.
*G06F 3/041* (2006.01)
*G06T 1/00* (2006.01)

(52) U.S. Cl.
USPC .......................................... 345/173; 345/418

(58) Field of Classification Search
USPC ................... 345/156, 157, 173, 178; 715/810
See application file for complete search history.

(56) References Cited

U.S. PATENT DOCUMENTS

| 5,748,185 A | 5/1998 | Stephan et al. |
|---|---|---|
| 6,784,869 B1 * | 8/2004 | Clark et al. .................... 345/156 |
| 6,988,246 B2 * | 1/2006 | Kopitzke et al. .............. 715/810 |
| 2004/0145612 A1 | 7/2004 | Kopitzke et al. |

* cited by examiner

*Primary Examiner* — Michael Faragalla
(74) *Attorney, Agent, or Firm* — Ingrassia Fisher & Lorenz, P.C.

(57) ABSTRACT

According to an example embodiment, display system includes a first display device and a multi-function display (MFD). The first display device is configured to selectively render a first cursor thereon. The MFD is separate from, and is in operable communication with, the first display device. The MFD includes a stimuli-sensitive display screen. A first CCD is at least selectively within a first area of the stimuli-sensitive display screen, and is configured to generate a first signal, in response to a first input that is sensed in the first area of the stimuli-sensitive display screen, for controlling the first cursor on the first display device. An avionics display is at least selectively rendered within in a first sub-area of a second area of the stimuli-sensitive display screen.

9 Claims, 8 Drawing Sheets

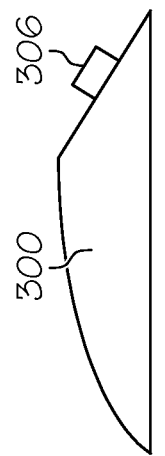
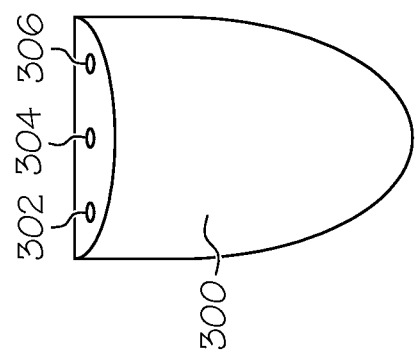
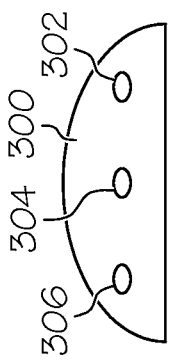

DISPLAY SYSTEM AND METHOD INCLUDING A STIMULI-SENSITIVE MULTI-FUNCTION DISPLAY WITH CONSOLIDATED CONTROL FUNCTIONS

PRIORITY CLAIMS

This is a continuation-in-part of U.S. application Ser. No. 11/680,418, filed Feb. 28, 2007.

BACKGROUND

1. Technical Field

This disclosure relates generally to display screens, and more particularly to a stimuli-sensitive display screen with consolidated control functions.

2. Description of the Related Art

Flight control system design continues to evolve towards the so-called "glass cockpit" model, where control functions for the aircraft and aircraft subsystems are increasingly displayed and manipulated using Multi-Function Displays (MFDs). As flat panel technology matures, the MFDs are becoming ever larger and expanding into all of the available cockpit space. In such an environment, it is desirable for pilots to rapidly manipulate data displayed on the MFDs or to input data while maintaining their primary focus on operating the aircraft safely. In such an environment, it is also desirable to consolidate other control functions that conventionally use dedicated hardware into the MFD in order to create space and to allow for tailored configurations that reduce pilot workload and reduce cost. Example embodiments address these concerns and may also address other unspecified concerns that are nevertheless present in the related art.

SUMMARY

According to an example embodiment, a display system includes a first display device and a multi-function display (MFD). The first display device is configured to selectively render a first cursor thereon. The MFD is separate from, and is in operable communication with, the first display device. The MFD includes a stimuli-sensitive display screen. A first Cursor Control Device (CCD) is at least selectively within a first area of the stimuli-sensitive display screen, and an avionics display is at least selectively rendered within in a first sub-area of a second area of the stimuli-sensitive display screen. The CCD is configured to generate a first signal, in response to a first input that is sensed in the first area of the stimuli-sensitive display screen, for controlling the first cursor on the first display device.

In another embodiment, a method of operating a display system having a stimuli-sensitive display screen that is separate from, and in operable communication with, a first display device, includes receiving a first input that is sensed within a first area of the stimuli-sensitive display screen, rendering a first cursor on the first display device, rendering an avionics display within a first sub-area of a second area of the stimuli-sensitive display screen, generating a first signal for controlling the first cursor based at least in part upon the first input, and adjusting a position of the first cursor on the first display device in response to the first signal.

BRIEF DESCRIPTION OF THE DRAWINGS

Example embodiments are described in further detail below with reference to the following drawings, in which:

FIGS. 3, 4, and 5, are top, side, and rear perspective diagrams, respectively, which further illustrate the handrest of the MFD in FIG. 1 according to an example embodiment;

DETAILED DESCRIPTION

Figure 1:
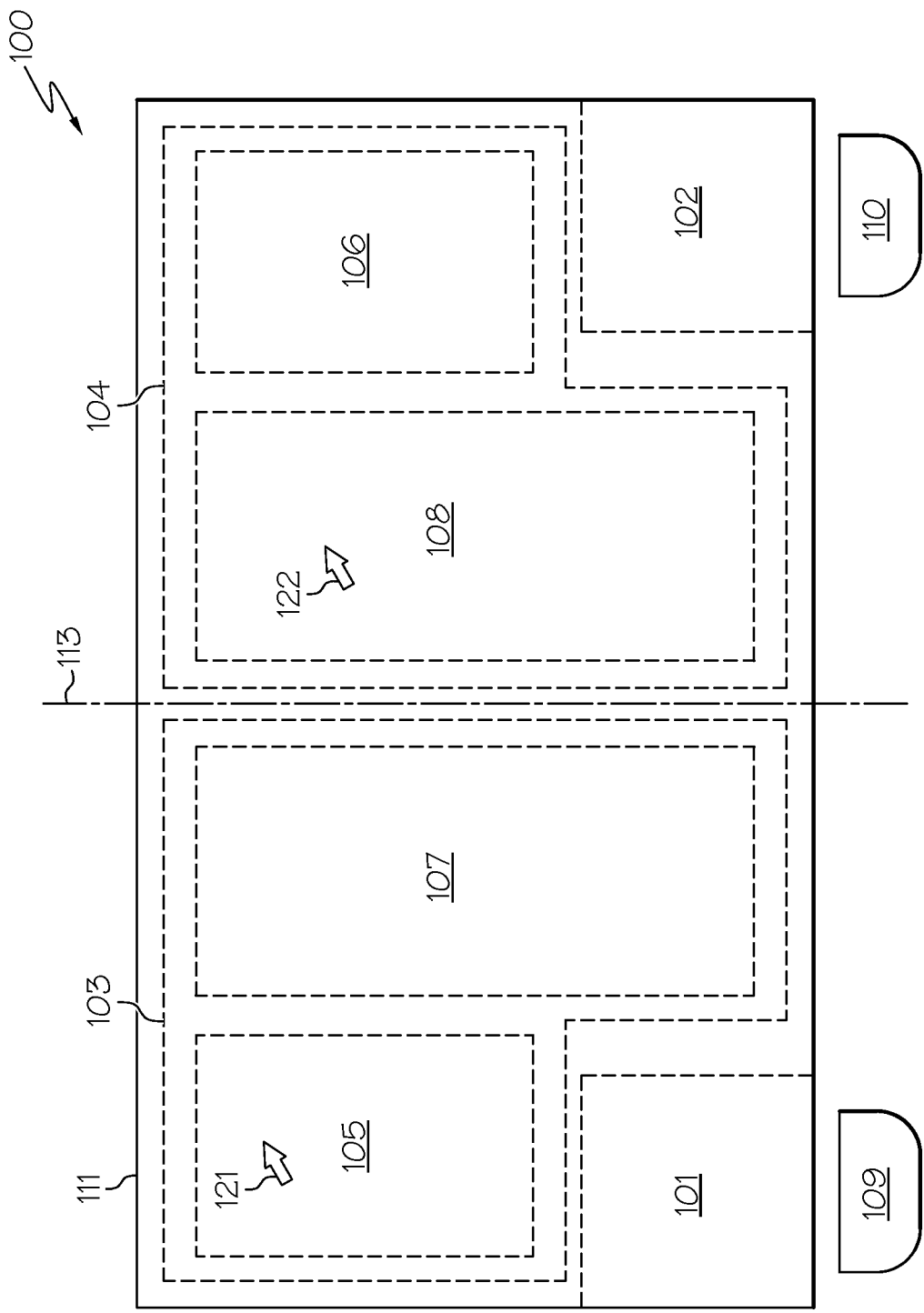
FIG. 1 is a front aspect diagram illustrating some components of an MFD and a possible display layout on the MFD according to an example embodiment.
Figure 2:
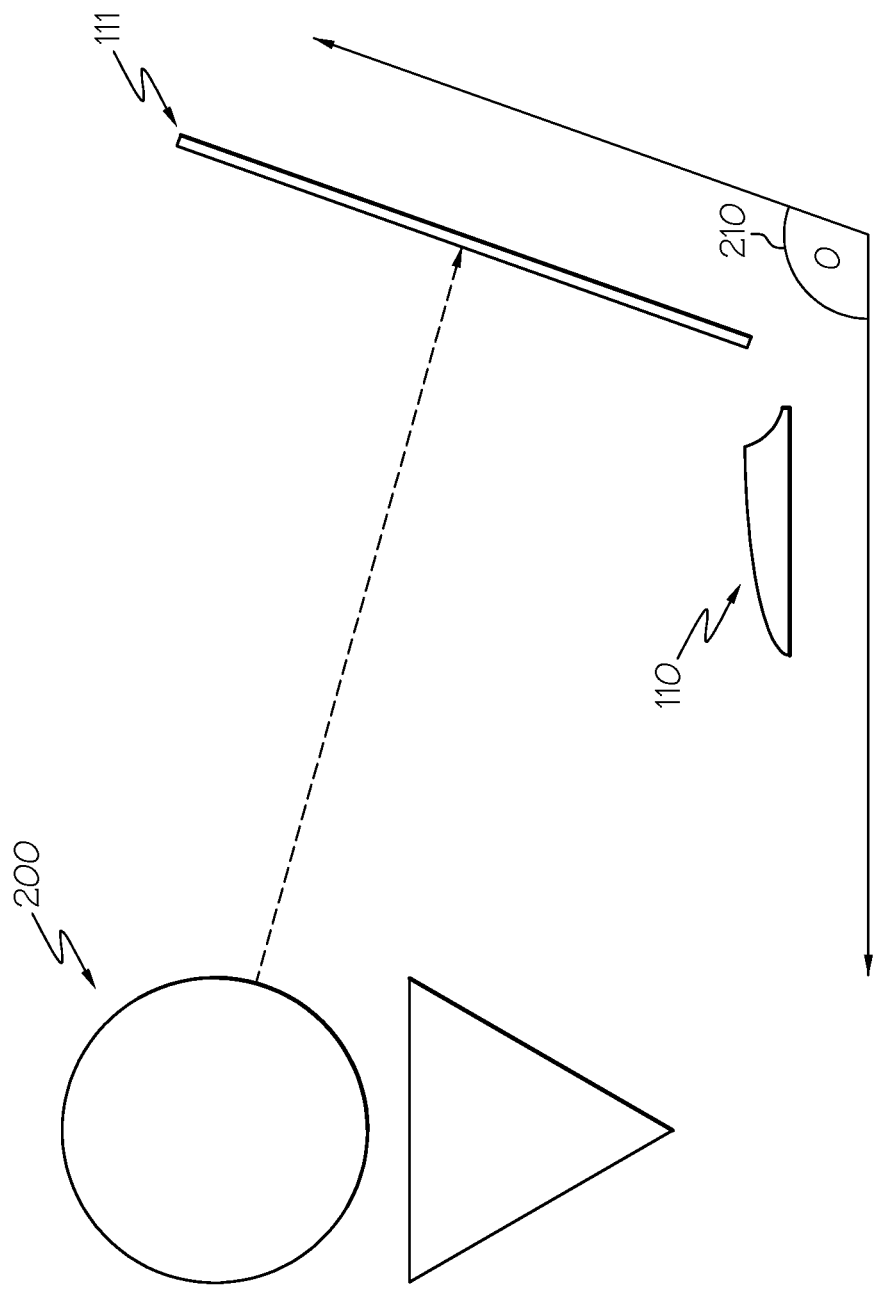
FIG. 2 is sectional diagram further illustrating the relationship of the components shown in FIG. 1.

FIG. 1 is a front aspect diagram illustrating some components of an MFD 100 and a possible display layout on the MFD according to an example embodiment. FIG. 1 is from the perspective of a pilot seated facing the front of the MFD 100. FIG. 2 is sectional diagram further illustrating the relationship of the components shown in FIG. 1. FIG. 2 is a cross-section along a plane that is parallel to the line 113 of FIG. 1.

As shown in FIGS. 1 and 2, the MFD 100 includes a stimuli-sensitive display screen 111, a first handrest 109, and a second handrest 110. To increase clarity, other cockpit structures such as the pilot's seat and bulkheads, which support the handrests 109, 110 and the stimuli-sensitive display screen 111, are not shown. As illustrated in FIG. 2, a relative position of a pilot 200 is facing the stimuli-sensitive display screen 111. Those of ordinary skill will appreciate that the pilot's seat may be manipulated so that the pilot is seated at a desired distance from the sensitive display 111 and the handrest 110. According to an example embodiment, the pilot 200 may comfortably place the palm of her hand on top of the handrest 110. The handrest 110 is close enough to the screen such that a finger of the hand that is resting on the handrest can be manipulated to contact the stimuli-sensitive display screen 111. According to an embodiment, the location of the handrest 110 relative to the stimuli-sensitive display screen 111 may be adjusted so that a comfortable position may be found for people having different sized hands and fingers.

An angle 210 exists between the handrest 110 and the stimuli-sensitive display screen 111. The exact value of the angle 210 depends upon the structures used to support the handrest 210 and the stimuli-sensitive display screen 111. According to some embodiments, the value of the angle 210 may range from about 90 degrees to about 180 degrees. Since a more obtuse angle is generally more ergonomically comfortable than a less obtuse angle, in presently preferred embodiments the angle 210 is greater than about 135 degrees, and more preferably, the angle is about 180 degrees.

For purposes of this disclosure, a stimuli-sensitive display screen is defined as a display screen that is capable of outputting visual data and capable of generating a signal in response to a physical manipulation of the display screen or the environment surrounding the display screen. For example, a stimuli-sensitive display screen may be a touch-sensitive display screen that generates a signal in response to a physical touching of a region of the display screen, a proximity-sensitive display screen that generates a signal in response to an object in proximity to a region of the display screen, or a light-sensitive display screen that generates a signal in response to optical radiation striking a region of the display screen.

The stimuli-sensitive display screen 111 may itself be part of a number of different display devices that generate visual output on the stimuli-sensitive display screen using one of many different technologies. For example, the stimuli-sensitive display screen 111 may be part of a color Cathode Ray Tube (CRT) display device, a monochromatic CRT display device, a flat panel display device, a Liquid Crystal Display (LCD) device, a plasma display device, an electro-luminescent display device, a Light Emitting Diode (LED) display device or the like. Detailed functional descriptions of these identified examples of stimuli-sensitive display screens or display devices, or for that matter stimuli-sensitive display screens or displays that were not identified, are not necessary at this point as they can be found elsewhere in the literature and are not required for an understanding of example embodiments.

As shown in FIG. 1, the stimuli-sensitive display screen 111 has a number of regions or areas that are indicated by dashed or dotted lines. In the example embodiment, the shape of the stimuli-sensitive display screen 111 is symmetric about an axis 113 that bisects the stimuli-sensitive display screen into a left region on the left-hand side of the axis 113 and a right region on the right-hand side of the axis 113. In the example embodiment, the areas 101, 103, 105, 107 are symmetric with the areas 102, 104, 106, and 108, respectively.

According to the example embodiment, the areas 103 and 104 are areas of the stimuli-sensitive display screen 111 that are designated for displaying one or more avionics displays. For purposes of this disclosure, an avionics display is any arrangement of visual data that is used for control, monitoring, or data entry for an aircraft or an aircraft subsystem. For example, an avionics display may be one that shows the primary flight displays such as altimeter and heading, or an avionics display may be one that indicates the fuel status of the aircraft or cabin pressure within the aircraft. Another avionics display may include both the primary flight displays and the fuel status of the aircraft. Another avionics display may include navigation (NAV) or communication (COM) functions, such as radio tuning and control. These are just a few examples of the multitude that exist, and an exhaustive description of every possible sort of avionics display is not necessary for an understanding of the example embodiments.

According to the example embodiment, the areas 103 and 104 are also areas of the stimuli-sensitive display screen 111 that are operable to display the cursors 121, 122 respectively. As illustrated in FIG. 1, the cursors 121, 122 are illustrated as arrows, but the shape of the cursor is not particularly important—many alternative shapes are possible. The cursors 121, 122 may be used to select a particular sub-area within the areas 103 and 104. In other words, the cursors can be used to identify a particular portion of an avionics display as the active part of the display. Alternatively, the cursors 121, 122 may be used to select different options in an avionics display that present one or more menu choices or selections for the pilot. The cursors 121, 122 may also be used for data entry purposes. For example, the cursors 121, 122 may be used to select one virtual keypad from a number of virtual keypads that are generated as part of an avionics display. Each of the keypads may have a unique letter or number associated with it.

According to the example embodiment, the areas 101 and 102 are areas of the stimuli-sensitive display screen that can be designated for use as Cursor Control Devices (CCDs). That is, inputs detected in the areas 101, 102 are used to control the movement of the cursors 121, 122 that are displayed in the areas 103, 104. In alternative embodiments, the inputs detected in the areas 101, 102 may be used to control the movement of other cursors in other display areas of the display screen 111.

In other alternative embodiments, the inputs detected in the areas 101, 102 may be used to control the movement of other cursors displayed on a second MFD that is different than MFD 100. In some of these alternative embodiments, the second MFD includes a stimuli-sensitive display screen. In other ones of these alternative embodiments, the second MFD does not include a stimuli-sensitive display screen.

In one example embodiment, inputs detected in area 101 are used to control the movement of the cursor 121 in the area 103, while inputs detected in area 102 are used to control the movement of the cursor 122 in the area 104. According to another embodiment, the cursor 121 is prevented from being displayed in the region to the right of the axis 113, while the cursor 122 is prevented from being displayed in the region to the left of the axis 113. In one example embodiment, the areas 101 and 102 are square areas having sides of approximately two and a half (2.5) inches. This size seems to be convenient, although of course the areas 101 and 102 could have other shapes and sizes.

The configuration for the stimuli-sensitive display screen 111 illustrated in FIG. 1 is just one example. Generally speaking, a stimuli-sensitive display screen may conveniently display a number of different avionics displays in different areas of the display screen. The number is limited only by the maximum size of the display screen and the smallest practically viewable area for each avionics display. The areas for the avionics display may be of different sizes, different shapes, and unlike the embodiment illustrated in FIG. 1, may not be symmetric relative to other display areas.

According to example embodiments, a stimuli-sensitive display screen has at least one area that is operable for use as a CCD for a cursor that is displayed either on the stimuli-sensitive display screen itself or on another display screen. In some embodiments, the at least one area designated for use as a CCD for a cursor can be dynamically reconfigured in different areas of the stimuli-sensitive display screen according to the wishes of the user of the stimuli-sensitive display screen. That is, different areas of the stimuli-sensitive display screen may be designated for use as the CCD according to the wishes of the user of the stimuli-sensitive display screen. Alternatively, in some situations it may be desirable to not use any portion of the stimuli-sensitive display screen for a CCD. Embodiments are reconfigurable for all situations.

It should be apparent that the MFD 100 is particularly well-suited for cockpit configurations where a pilot and co-pilot are seated side by side. However, other embodiments are not so limited. For example, it is common in specialized test aircraft or aboard large military aircraft for one or more crewmembers located in positions other than the pilot position(s) to monitor or control an aircraft subsystem for purposes of redundancy or independence. According to other embodiments, there may be more or less than the two areas 103, 104 for avionics displays and the two areas 101 or 102 for CCDs, depending on the particular crewstation configuration.

As illustrated in FIGS. 1 and 2, the MFD 100 further includes handrests 109 and 110, which are adapted to work cooperatively with the CCD areas 101, 102, respectively. The handrests 109 and 110 are disposed adjacent to their corresponding CCD areas 101, 102, such that a pilot seated in the left position could place the palm of his right hand on the top of the handrest 109 and use a finger to apply inputs to the CCD area 101 of the stimuli-sensitive display screen 111, while another pilot seated in the right position could place the palm of his left hand on the top of the handrest 110 and use a finger to apply inputs to the CCD area 102 of the stimuli-sensitive display screen 111. In this manner, the two pilots can control their corresponding cursors 121 or 122 and manipulate their corresponding avionics displays in areas 103 and 104 in any manner that is desired. It should be apparent that the avionics displays that are present in area 103 need not be the same avionics displays that are present in area 104.

FIGS. 3, 4, and 5, are top, side, and rear perspective diagrams, respectively, that illustrate an example handrest 300 according to an embodiment. The handrest 300 is suitable for use as the handrest 109 or 110 in FIGS. 1 and 2. As illustrated in FIGS. 3-5, the handrest 300 has an ergonomic shape. The handrest 300 further includes buttons 302, 304, and 306. The buttons 302, 304, 306 may be used cooperatively with the cursors 121 or 122 to select or deselect areas of the avionics displays, or choose menu-driven choices that are presented to the pilot in the avionics displays, similar to the way a mouse peripheral and a cursor displayed on a personal computer display screen are used to select, deselect, or choose menu-driven choices. It should be apparent that many different designs for the handrest 300 are possible. For example, in alternative embodiments the handrest may include large push-buttons that are may be manipulated using a thumb. In other embodiments, the handrest may include a trackball that is also operable to control a cursor, which could provide a backup in case the CCD areas 101 or 102 experienced a failure.

Returning to FIG. 1, the area 103 includes the area 105 and 107, while the area 104 includes the area 106 and 108. According to the example embodiment, the areas 105 and 106 are areas of the stimuli-sensitive display screen 111 can be designated for displaying a virtual touchkey array. As was indicated above, virtual touchkeys can be used, in conjunction with the cursors 121, 122, for data entry. Alternatively, because the areas 105, 106 are themselves part of the stimuli-sensitive display screen 111, the touchkeys themselves may be physically contacted to input data. According to an example embodiment, both methods would be available to a pilot.

According to the example embodiment, the areas 107 and 108 are areas of the stimuli-sensitive display screen 111 that are designated to display any avionics display other than the array of virtual touchkeys that are displayed in areas 105 and 106.

Figure 7:
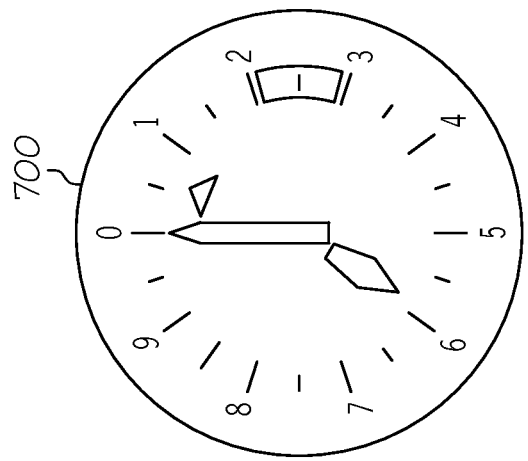
FIGS. 6 and 7 illustrate just two example flight data displays that may be rendered on the MFD according to an embodiment.
Figure 6:
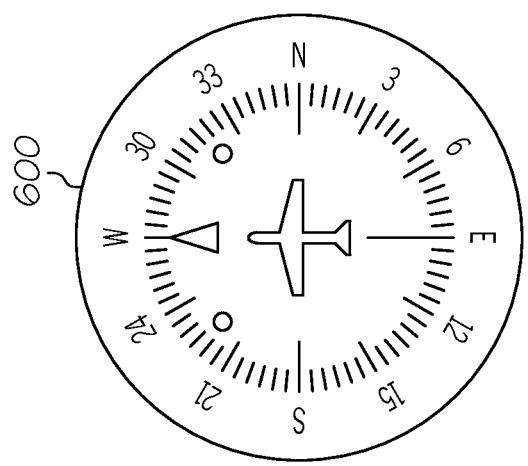

FIGS. 6 and 7 illustrate avionics displays 600, 700 according to an example embodiment. The avionics displays 600, 700 are just two examples of what can be displayed in areas 107 and 108 of FIG. 1. Avionics display 600 is a compass that illustrates the heading of the aircraft. Avionics display 700 is an altimeter that shows the aircraft's elevation above mean sea level. Thus, as was explained above, the avionics displays 600 and 700 would be considered primary flight displays. In the example embodiment, the avionics displays 600 and 700, even though they are generated on a stimuli-sensitive display screen 111, have an appearance that emulates the old-style altimeters and compasses that were implemented with dedicated hardware. Some pilots prefer this look, although of course altimeters or compasses may be implemented in many different ways. For example, an altimeter or compass could be simply implemented in a flight data display as a number whose value reflected the aircraft's current altitude and heading.

Figure 8:
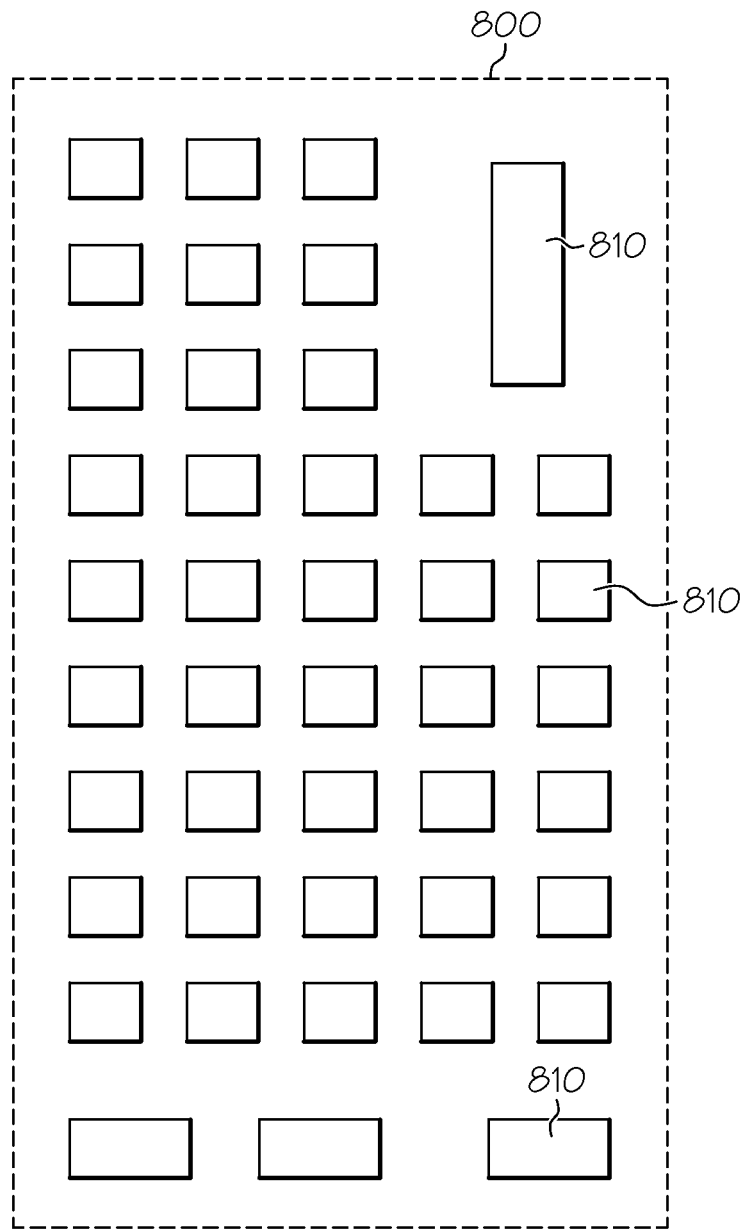
FIG. 8 illustrates a virtual touchkey array according to an example embodiment.

FIG. 8 illustrates a virtual touchkey array 800 according to an example embodiment. The virtual touchkey array 800 includes a number of pushbuttons 810 that are displayed by the stimuli-sensitive display screen 111. Each one of the pushbuttons 810 can be configured to trigger a particular function when the area of the stimuli-sensitive display screen 111 corresponding to the pushbutton 810 is selected using either the cursors 121, 122 and one of the buttons 302, 304, 306 or, alternatively, a direct physical touch to the pushbutton 810.

The stimuli-sensitive display screen 111 is operable to display any combination of letters, words, numbers, or symbols within the pushbuttons 810 that would indicate the function corresponding to a selection of that particular pushbutton. For example, the stimuli-sensitive display screen 111 may display the numbers 0, 1, 2, . . . , 8, 9 within a corresponding one of the pushbuttons 810. These pushbuttons 810 may be used for data entry. Within other pushbuttons 810, letter sequences such as NAV, COM, FUEL, etc., may be displayed. These pushbuttons may be used to cause the stimuli-sensitive display screen 111 to display avionics displays associated with NAV, COM, or FUEL functions. In FIG. 8, the pushbuttons 810 are not shown with any particular combination of letter, words, numbers, or symbols to emphasize that the stimuli-sensitive display screen 111 may display any desired combination of letters, words, numbers, or symbols within a pushbutton 810.

The touchkey array 800 is just one example of a configuration of touchkeys that can be generated in areas 105 and 106 of FIG. 1. As was explained above, the touchkey array 800 may be used for data entry. According to some embodiments, the selection of a particular pushbutton 810 may result in the display of a different avionics display in the areas 107 and 108.

Figure 9:
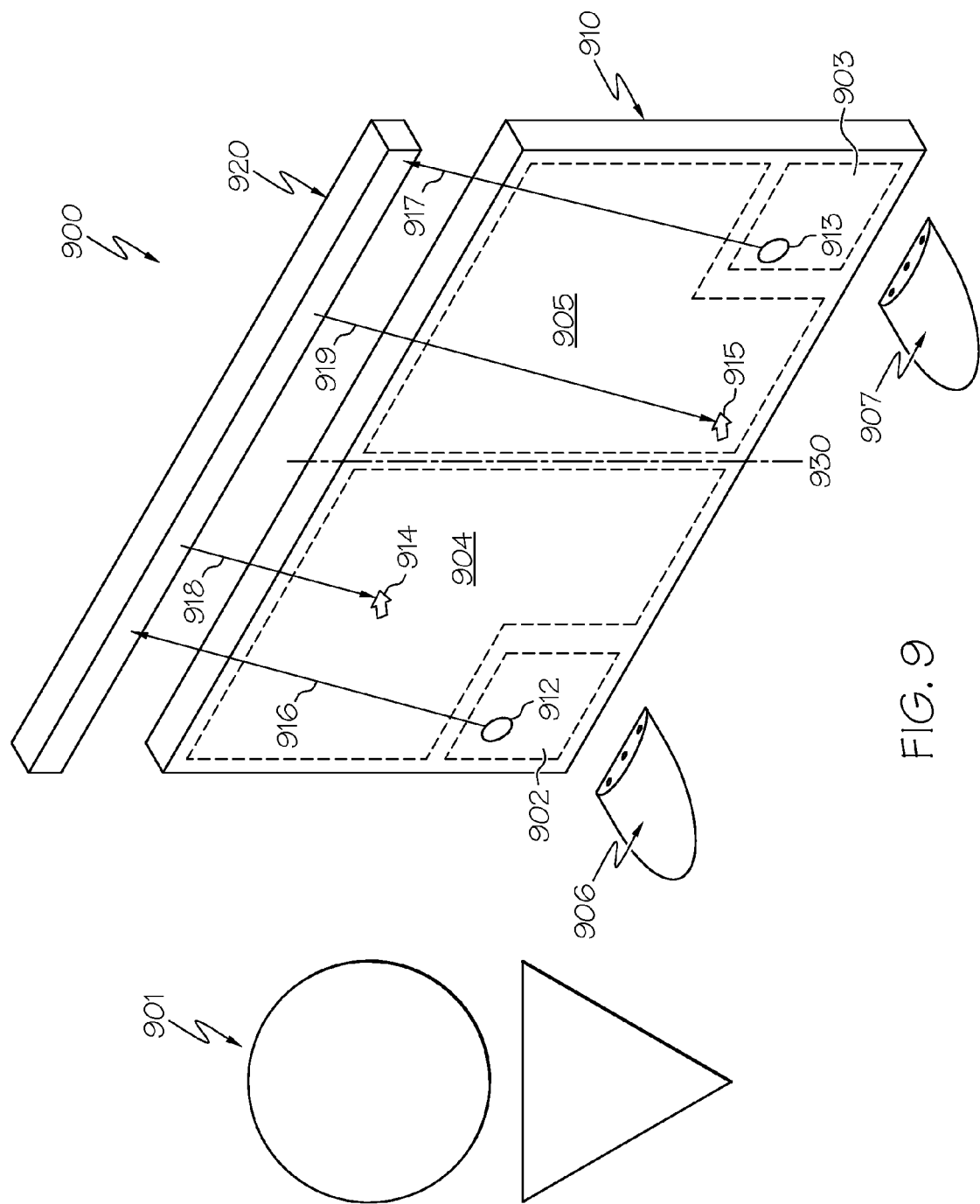
FIG. 9 is a block diagram that is representative of some components of a flight control system according to an example embodiment.

FIG. 9 is a block diagram that is representative of some components of a flight control system 900 according to an example embodiment. The flight control system 900 includes a stimuli-sensitive display screen 910, a processor 920, and two handrests 906, 907 that are disposed adjacent to the areas 902, 903 of the stimuli-sensitive display screen. According to the example embodiment, the stimuli-sensitive display screen 910 and handrests 906, 907 are the same as the stimuli-sensitive display screen 111 and handrests 109, 110 of FIG. 1, and have the same capabilities. Thus, a duplicative description is omitted.

The processor 920 is operable to control the stimuli-sensitive display screen 910 in order to generate one or more avionics displays in the areas 904, 905 as well as generate the cursors 914, 915 in the areas 904, 905, respectively. The processor 920 preferably encompasses one or more functional blocks and can include any number of individual microprocessors, memories, storage devices, interface cards, or other processor components.

According to an example embodiment, the areas 902, 903 of the stimuli-sensitive display screen 910 are operable to generate signals 916, 917 when an input is sensed at locations 912, 913 in the areas 902, 903. Preferably, these inputs are caused by a crewmember 901 (e.g., a pilot or co-pilot) who is attempting to control either the cursor 914 or the cursor 915. The signals 916, 917 are transmitted to the processor 920. The processor 920 generates one or more control signals 917, 918 based upon the signals 916, 917 and these control signals are used to cause different portions of the areas 904, 905 to display the cursors 914, 915. Thus, a crewmember 901 can control a movement of the cursor 914 or a movement of the cursor 915 based upon a physical manipulation (e.g., a touch) of the cursor control areas 902, 903 of the stimuli-sensitive display screen 910.

In some embodiments, the crewmember 901 can also control the movement of the cursor 914 or a movement of the cursor 915 based upon a physical manipulation (e.g., a touch) of the stimuli-sensitive display screen 910 in the area where the crewmember wishes to place the cursor. Of course, in embodiments that use a CCD area of a stimuli-sensitive display screen to control a movement of a cursor in another display screen that is not stimuli-sensitive, this capability would not be available.

Figure 10:
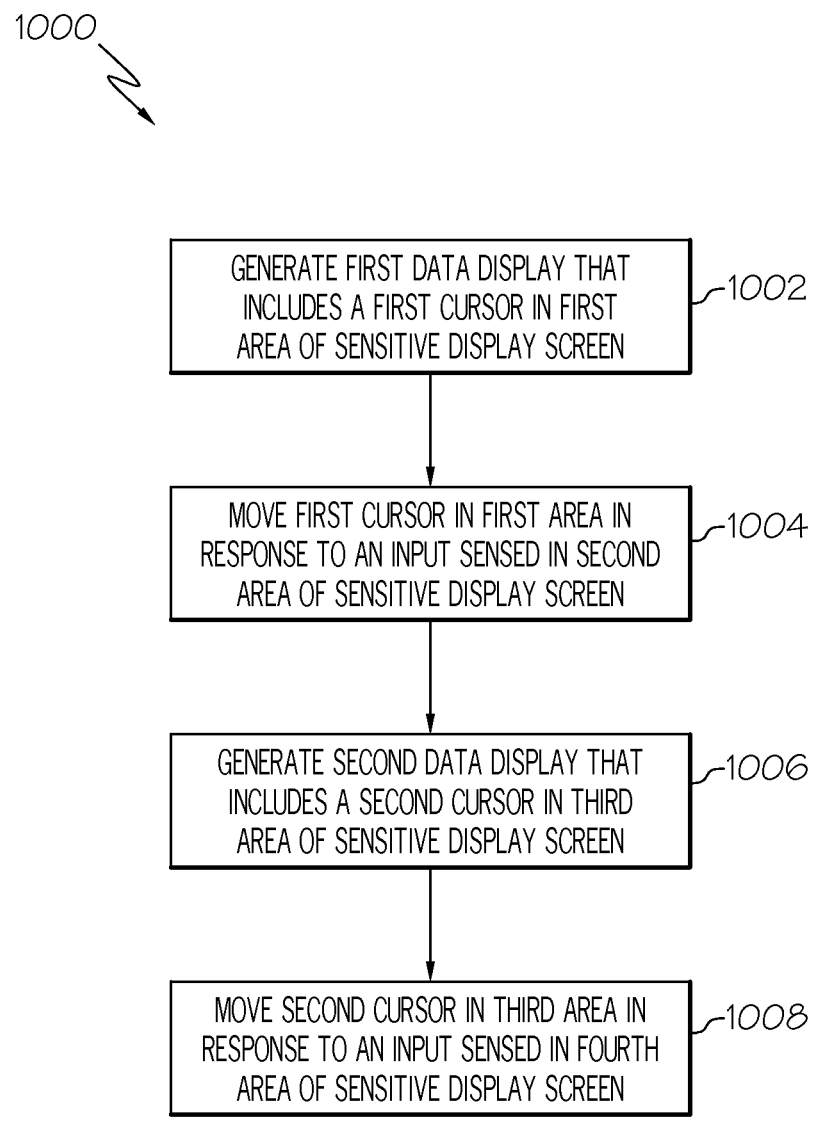
FIG. 10 is a flow diagram illustrating some example processes that are included in a method according to an example embodiment.

FIG. 10 is a flow diagram illustrating some example processes that are included in a method 1000 according to an example embodiment. In the example embodiment 1000, the method begins in process 1002 and proceeds sequentially through processes 1004, then 1006, and finally 1008. However, not all embodiments are so limited. That is, in some embodiments, processes 1002 and 1006 may occur concurrently, while in other embodiments processes 1004 and 1008 may occur concurrently. Other embodiments may only include a subset of the processes that are included in method 1000.

Example embodiment 1000 begins with process 1002, which includes generating a first avionics display in a first area of a stimuli-sensitive display screen, where the first avionics display includes a first cursor. Next, process 1004 includes moving the first cursor in the first area in response to an input that is sensed in a second area of the stimuli-sensitive display screen. According to an example embodiment, the first area of the stimuli-sensitive display screen may be separate from the second area of the stimuli-sensitive display screen. According to an alternative embodiment, the first avionics display may be generated on a display screen that is different from the stimuli-sensitive display screen.

After process 1004, process 1006 includes generating a second data display in a third area of the stimuli-sensitive display screen, where the second data display includes a second cursor. Finally, process 1008 includes moving the second cursor in the third area in response to an input that is sensed in a fourth area of the stimuli-sensitive display screen.

As noted above, in some alternative embodiments, the inputs detected in the areas 101, 102 may be used to control the movement of other cursors displayed on other displays that are different than MFD 100. Although the configurations of these alternative embodiments may vary, two example embodiments are depicted in FIGS. 11 and 12, and with reference thereto will now be described.

Figure 11:
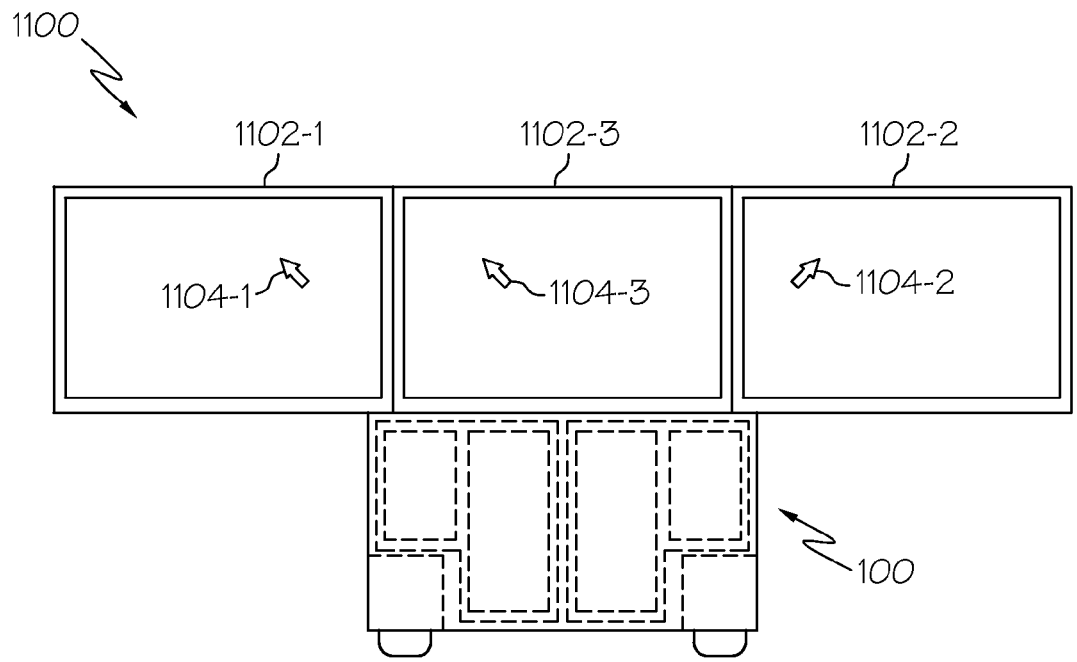
FIGS. 11 and 12 depict various embodiments of example avionics display systems that may incorporate the stimuli-sensitive display of FIG. 1.
Figure 12:
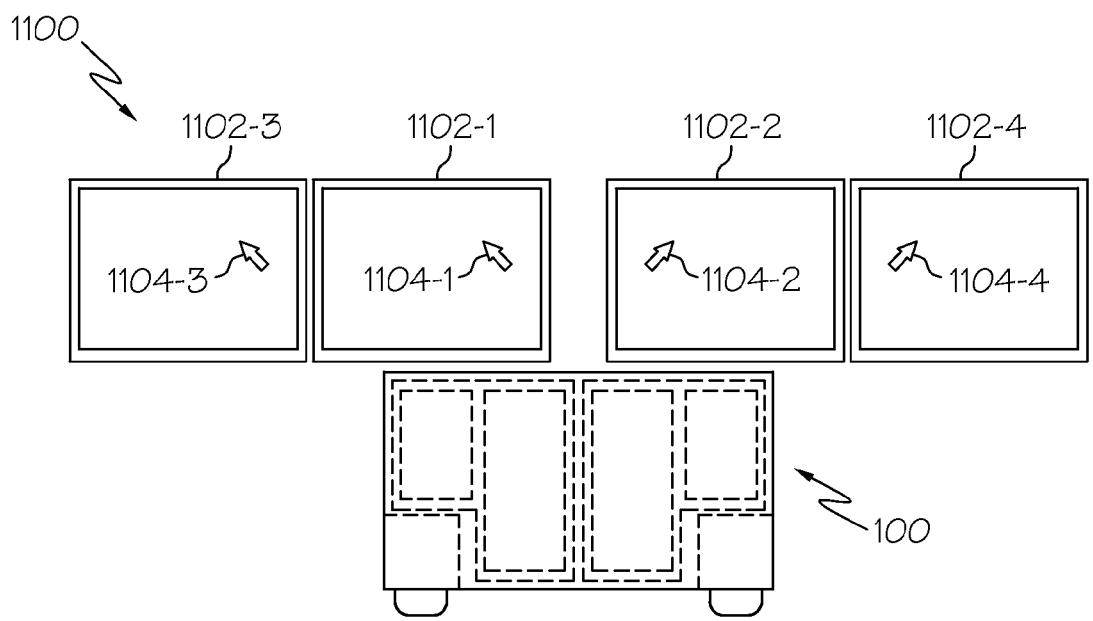

Referring first to FIG. 11, the example display system 1100 depicted therein includes a plurality of avionics displays 1102 (e.g., 1102-1, 1102-2, 1102-3) and the MFD 100 having the stimuli-sensitive display screen 111. Although the embodiment depicted in FIG. 11 includes three avionics displays 1102, it well be appreciated that this is merely one example of an embodiment, and that the display system 1100 could include more or less than this number of avionics displays 1102. For example, in the embodiment depicted in FIG. 12, the display system 1100 includes four avionics displays 1102 (e.g., 1102-1, 1102-2, 1102-3, 1102-4). Moreover, although the MFD's 100 in FIGS. 11 and 12 are depicted as integral display devices, it will be appreciated that these may be implemented using separate devices.

No matter the specific number of avionics displays 1102 included in the system 1100, each avionics display 1102 is separate from, and in operable communication with, the display device 100, and is configured to selectively render at least a cursor 1104 thereon. Thus, in the embodiment depicted in FIG. 11, the first avionics display 1102-1 is configured to selectively render at least a first cursor 1104-1 thereon, the second avionics display 1102-2 is configured to selectively render at least a second cursor 1104-2 thereon, and the third avionics display 1102-3 is configured to selectively render at least a third cursor 1104-3 thereon. Similarly, in the embodiment depicted in FIG. 12, the first avionics display 1102-1 is configured to selectively render at least a first cursor 1104-1 thereon, the second avionics display 1102-2 is configured to selectively render at least a second cursor 1104-2 thereon, the third avionics display 1102-3 is configured to selectively render at least a third cursor 1104-3 thereon, and the fourth avionics display 1102-4 is configured to selectively render at least a fourth cursor 1104-4 thereon. It will be appreciated that the separate avionics displays 1102 may also be configured, and preferably are configured, to selectively render various types of other data thereon.

It is noted that although the cursors 1104 are illustrated as arrows, this particular shape is merely exemplary, and various alternative shapes are possible. The cursors 1104 may be used to select particular sub-areas rendered on the displays 1102. In other words, the cursors 1104 can be used to identify a particular portion of the avionics display 1102 as the active part of the display. Alternatively, the cursors 1104 may be used to select rendered options associated with one or more menu choices or selections. The cursors 1104 may also be used for data entry purposes.

In a particular preferred embodiment, the system 1100 depicted in FIG. 11 is configured such that inputs detected in area 101 may be used to control the movement of the first cursor 1104-1 rendered on the first avionics display 1102-1, while inputs detected in area 102 are used to control the movement of the second cursor 1104-2 rendered on the second avionics display 1102-2. It is noted that the third cursor 1104-3 that is rendered on the third avionics display 1102-3, may be controlled by inputs detected in area 101 and/or 102. In alternative embodiments, the first, second, and third cursors 1104 may be controlled by inputs detected in area 101 and/or by inputs detected in area 102.

The embodiment depicted in FIG. 12 may be configured such that inputs detected in area 101 may be used to control the movement of the first cursor 1104-1 rendered on the first avionics display 1102-1 and the third cursor 1104-3 rendered on the third avionics display 1102-3, while inputs detected in area 102 are used to control the movement of the second cursor 1104-2 rendered on the second avionics display 1102-2 and the fourth cursor 1104-4 rendered on the fourth avionics display 1102-4. This embodiment may also be configured such that inputs detected in areas 101 and/or 102 may, at least selectively, be used to control the movement of any one of the first, second, third, or fourth cursors 1104 rendered on any one of the first, second, third, or fourth displays 1102, respectively.

While at least one example embodiment has been presented in the foregoing detailed description, it should be appreciated that a vast number of variations exist. It should also be appreciated that the example embodiment or example embodiments are not intended to limit the scope, applicability, or configuration of the invention in any way. Rather, the foregoing detailed description will provide those skilled in the art with a convenient road map for implementing the inventive aspects that may be found in at least one embodiment. The inventor regards the subject matter of the invention to include all combinations and subcombinations of the various elements, features, functions and/or properties disclosed in the example embodiments. It should be further understood that various changes can be made in the function and arrangement of elements without departing from the scope of the invention as set forth in the appended claims and the legal equivalents thereof.

The invention claimed is:

1. A display system, comprising:
a first display device configured to selectively render a first cursor and a second cursor thereon; and
a multi-function display (MFD) separate from, and in operable communication with, the first display device, the MFD comprising:
a stimuli-sensitive display screen;
a first Cursor Control Device (CCD) at least selectively within a first area of the stimuli-sensitive display screen, the first CCD configured to generate a first signal, in response to a first input that is sensed in the first area of the stimuli-sensitive display screen, for controlling the first cursor on the first display device;
a second CCD within a third area of the stimuli-sensitive display screen, the second CCD configured to generate a second signal, in response to a second input that is sensed in the third area of the stimuli-sensitive display screen, for controlling the second cursor on the first display device; and
an avionics display at least selectively rendered within a first sub-area of a second area of the stimuli-sensitive display screen,
wherein the stimuli-sensitive display screen is configured to selectively display (i) the first cursor in the second area of the stimuli-sensitive display screen, and (ii) the second cursor in a fourth area of the stimuli-sensitive display screen.

2. The display system of claim 1, wherein the first and second area occupy a first half of the stimuli-sensitive display screen, and wherein the third and the fourth area occupy a second half of the stimuli-sensitive display screen.

3. The display system of claim 1, further comprising:
a first hand rest disposed adjacent to the first area of the stimuli-sensitive display screen; and
a second hand rest disposed adjacent to the third area of the stimuli-sensitive display screen.

4. The display system of claim 1, wherein the MFD further comprises a touchkey display in a second sub-area of the second area of the stimuli-sensitive display.

5. A display system, comprising:
a first display device configured to selectively render a first cursor thereon;
a second display device configured to selectively render a second cursor thereon, the second display device separate from the first display device; and
a multi-function display (MFD) separate from, and in operable communication with, the first display device and the second display device, the MFD comprising:
a stimuli-sensitive display screen;
a first Cursor Control Device (CCD) at least selectively within a first area of the stimuli-sensitive display screen, the first CCD configured to generate a first signal, in response to a first input that is sensed in the first area of the stimuli-sensitive display screen, for controlling the first cursor on the first display device;
a second CCD within a third area of the stimuli-sensitive display screen, the second CCD configured to generate a second signal, in response to a second input that is sensed in the third area of the stimuli-sensitive display screen, for controlling the second cursor on the second avionics display;
a first avionics display at least selectively rendered within a first sub-area of a second area of the stimuli-sensitive display screen; and
a second avionics display at least selectively rendered within a first sub-area of a fourth area of the stimuli-sensitive display.

6. The display system of claim 5, further comprising:
a first hand rest disposed adjacent to the first area of the stimuli-sensitive display screen; and a second hand rest disposed adjacent to the third area of the stimuli-sensitive display screen.

7. The display system of claim 6, wherein the first and second hand rests each comprise one or more buttons to select or deselect areas on the stimuli-sensitive display screen.

8. The display system of claim 4, wherein the MFD further comprises a touchkey display in a second sub-area of the fourth area of the stimuli-sensitive display.

9. The display system of claim 5, wherein the stimuli-sensitive display screen is further configured to selectively display the second cursor in a second area of the stimuli-sensitive display screen.

* * * * *